July 5, 1960
H. C. PAVIAN
2,943,568
STABILIZING DEVICE
Filed Dec. 18, 1944
3 Sheets-Sheet 1
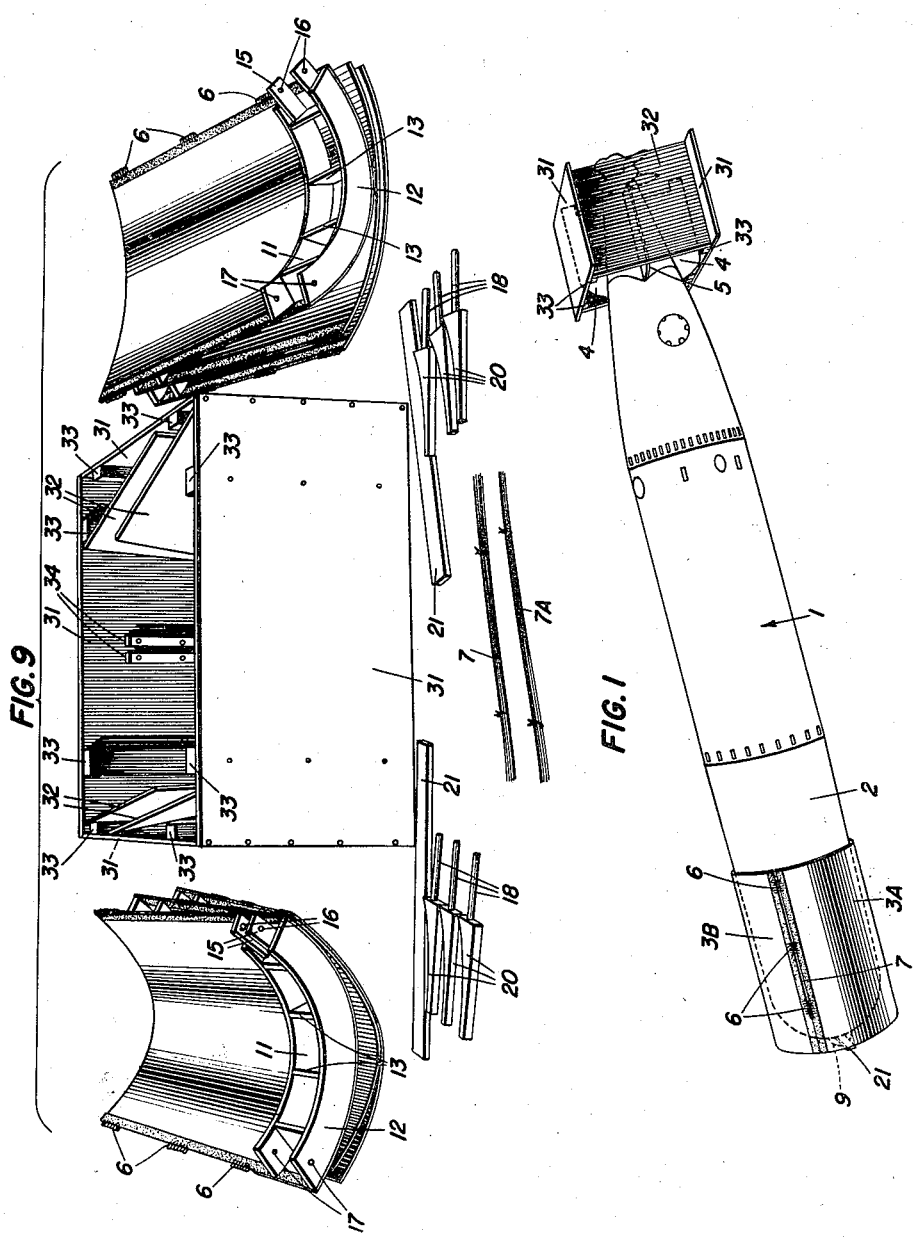
INVENTOR
HENRY C. PAVIAN
BY
ATTORNEY

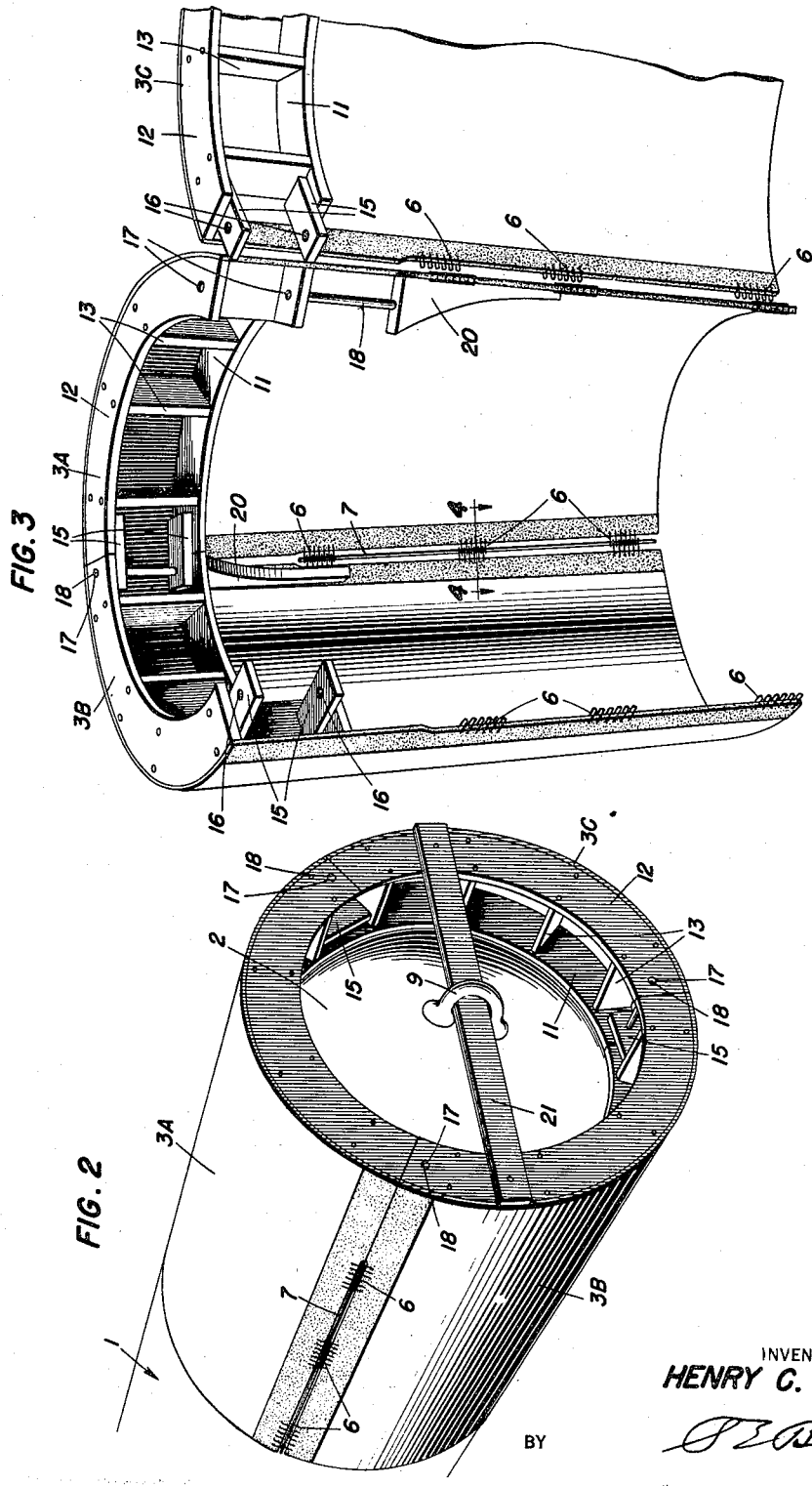

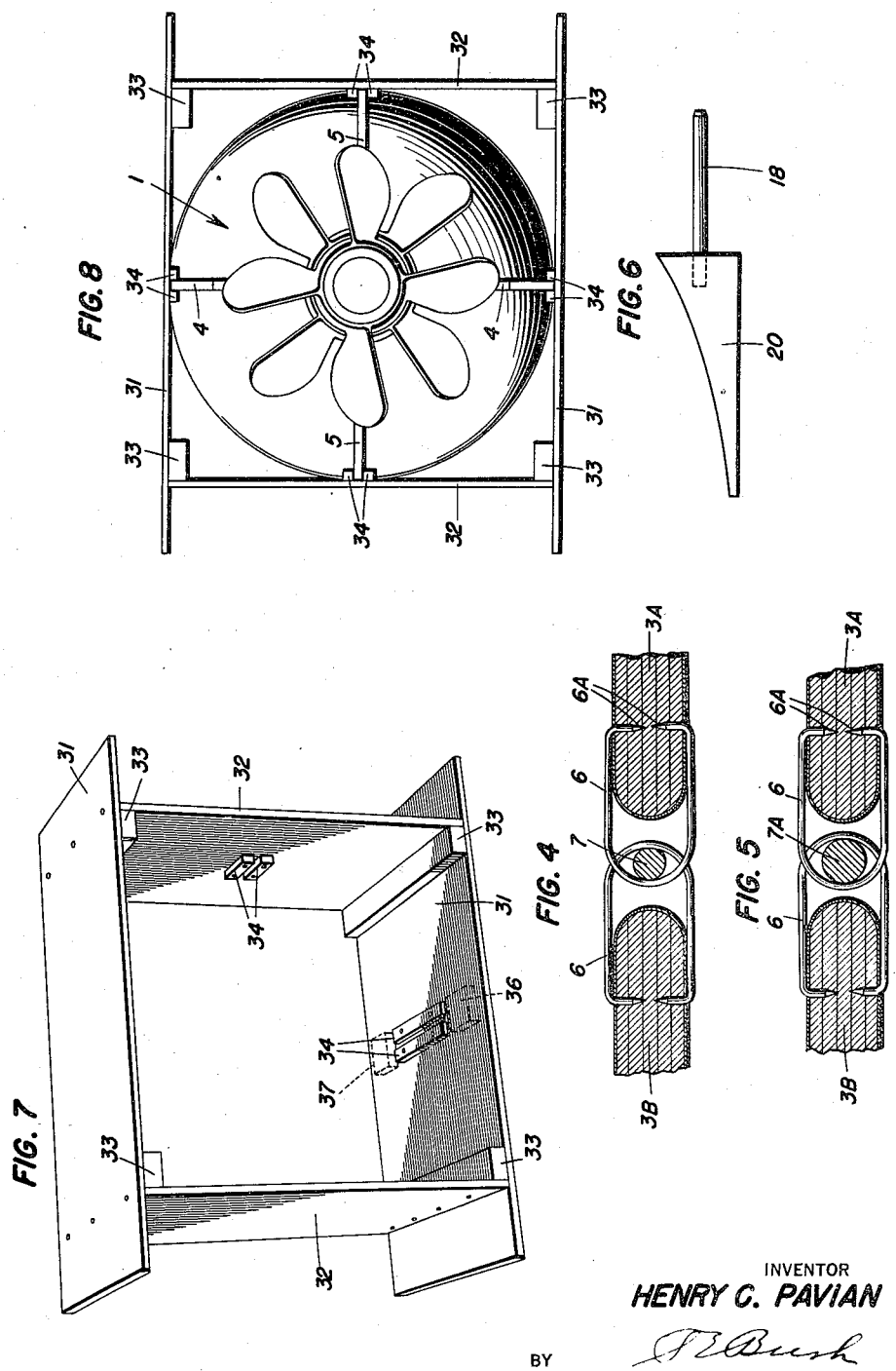

United States Patent Office 2,943,568
Patented July 5, 1960

2,943,568

STABILIZING DEVICE

Henry C. Pavian, United States Navy, Newport, R.I., assignor to the United States of America as represented by the Secretary of the Navy Filed Dec. 18, 1944, Ser. No. 568,739

7 Claims. (Cl. 102—7)

(Granted under Title 35, U.S. Code (1952), sec. 266)

This invention relates to means for stabilizing the flight characteristics and preventing the injury of bodies dropped or projected through the air into water from substantial heights, having particular reference to missiles, such as aircraft torpedoes, adapted to be dropped from airplanes.

An important object of the invention is to provide means of the indicated character which enables the successful launching of aircraft torpedoes from airplanes moving at greater heights and velocities than it has heretofore been possible to employ without injury to the torpedo upon impact of the latter with the water.

Another object is to provide such protective and stabilizing means which may be simply, quickly and inexpensively manufactured in large quantities, which is light, easily portable, and which may be shipped and stored in knocked-down condition.

Other objects and advantages will be apparent upon consideration of the present disclosure in its entirety.

In the drawing:

Fig. 1 is an elevational perspective view of an aircraft torpedo provided with stabilizing means constructed in accordance with the present invention;

Fig. 2 is a perspective view on a larger scale, showing the nose of the torpedo with the drag ring portion installed thereupon;

Fig. 3 is a perspective view of the drag ring assembly removed from the torpedo, one section thereof being separated from the remainder and partially broken away;

Fig. 4 is a sectional detail taken substantially on the line 4—4 of Fig. 3;

Fig. 5 is a sectional detail similar to Fig. 4 but showing a securing wire of different diameter installed in the fastening means;

Fig. 6 is a side elevational view of one of the centering block and dowel pin assemblies;

Fig. 7 is a perspective view of the tail stabilizer assembly;

Fig. 8 is a rear elevational view of a torpedo with tail stabilizer assembly installed; and Fig. 9 is a perspective view of two nose drag ring assemblies and two complete tail stabilizer assemblies, the parts being shown knocked-down, except for the assembly of one of the tail stabilizer units in a manner to cooperate in the forming of a box within which the other components may be packed.

Referring now to the drawings, reference character 1 designates generally a torpedo of a type adapted to be dropped by an airplane, although it will be appreciated that the invention is equally applicable to other items of ordnance. Great difficulty has been involved in so controlling the dropping and the flight of aircraft torpedoes as to assure maintenance thereby of a position or attitude of tangency with respect to the curved path of fall. The tendency of the torpedo to gyrate or to be deflected due to undesirable forces applied either upon launching or during flight frequently results in the torpedo entering the water in an inclined position, or otherwise than in a straight dive along the line of flight, with consequent damage. This situation has greatly restricted the height and speed at which torpedo planes could operate during the launching of torpedoes. With the introduction of my improved protective stabilizing means, it becomes possible to operate torpedo planes at much greater altitudes and speeds, the planes being thus rendered less vulnerable to antiaircraft fire and other counter-measures.

To the head section 2 of the torpedo is applied a drag ring assembly comprising a plurality of partly cylindrical sections 3A, 3B, 3C, three being the preferred number, as shown. These are secured together along their longitudinal edges to form a continuous cylindrical enclosure. The entire drag ring assembly, including the cylindrical sections referred to, is preferably formed of relatively rigid but frangible material such as wood, the sections 3A, 3B, 3C being preferably of plywood. The sections are separably fastened together by a plurality of wire clips 6 having inturned sharpened ends 6A driven into the wood, the clips projecting from the edges of the drag ring sections in such manner as to enable overlapping as shown in Figs. 4 and 5. The clips 6 may comprise ordinary belt lacing clips, such as are used to secure together the ends of endless belting. A wire 7 is run through the overlapping sections of the clips in the usual manner of securing such clips in the art of belt-lacing, as illustrated in Figs. 4 and 5. This method of fastening will be seen to permit the sections to swing hinge-fashion, and it will also be appreciated that a measure of adjustability is thus provided, permitting the drag ring to be fitted accurately to the torpedo, inasmuch as wires of different diameters may be substituted one for another, to compensate for differences in the diameters of the nose sections of torpedoes, as well as for variations due to shrinkage of the wood or tolerances in the manufacture of the drag ring parts. The larger wire shown in Fig. 5 is designated 7A.

The forward extremity of the ring assembly projects to a position in substantial transverse alignment with the hoisting ring 9 carried by the nose of the torpedo, and is of a diameter greater than that of the head section 2 and its diminishing nose portion as shown in Fig. 1. A pair of longitudinally spaced reinforcing rings formed in sections corresponding to the main sections 3A, 3B, 3C and generally designated 11, 12 are secured to the inner surface of the assembly and project inwardly therefrom, one at the forward extremity and one spaced rearwardly therefrom a relatively short distance, as shown. Additional reinforcing is provided by radial struts 13 extending between and secured to the reinforcing ring sections, as shown in Figs. 2 and 3. Corresponding ends of each of the reinforcing ring sections carry hinge plates 15 adapted to overlap the adjacent reinforcing ring sections, the overlapping portions of the hinge plates and ring sections being perforated, as indicated at 16, 17 in such manner that the perforations register when the parts are assembled, to permit the projection of dowel pins therethrough. The dowel pins, designated 18, not only provide additional securing means for the drag ring sections, but support the radially disposed spacer blocks 20, contoured conformably to the curved nose of the torpedo and adapted to center the drag ring assembly thereupon when the device is installed. Dislodgment of the drag ring assembly prior to or during flight is prevented by a simple strip of wood 21 nailed or otherwise fastened to the forward reinforcing ring assembly and extending through the hoisting ring 9.

When the torpedo is released, the drag ring assembly, by reason of the blunt nose which it provides, stabilizes the flight of the torpedo in the air, in accordance with well-known principles, and in addition, because of the increased air resistance which it imposes, slows the flight of the torpedo, causing it to strike the water at lower velocity than would otherwise be the case. The assembly is broken away by the impact with the water, so that the torpedo may proceed in the water free of the drag ring assembly.

The general arrangement of the rear stabilizer assembly upon the torpedo is shown in Fig. 1. As there indicated, flat sections 31, 32, which also may be formed of plywood or the like, are assembled in the form of a hollow rectangle to provide a supplemental box fin structure adapted to be positioned upon and cooperate with the rudder blades 4, 5 of the torpedo. The plane sections 31, 32 are nailed or otherwise secured together, and braced by cleats 33, as clearly shown in Fig. 7. Additional cleats as 34 are centrally secured to the inner surfaces of the box fin section in closely spaced parallel relation, adapted to provide locating slots for and overengage the blades of the torpedo. Supplemental blocks 36, 37 may be employed, secured to the inner surfaces of the box sections at the ends of the torpedo fins to prevent longitudinal displacement of the box fin assembly. These may be nailed in place after the assembly is installed upon the torpedo, and are shown in dotted lines in Fig. 7.

During the torpedo's fall the box fin assembly provides additional fin surface, thereby increasing stability.

The torpedo blades and supplemental box fins act cooperatively similarly to the fin assemblies of this type used upon aircraft bombs. Upon striking the water, the supplemental box fin assembly is broken away and the torpedo proceeds through the water without it.

As best shown in Fig. 9, four of the longer tail box fin sections 31 may be nailed together at their extreme ends to form the sides of a shipping box into which the shorter sections 32 may be packed, together with two complete nose drag ring assemblies, the latter being somewhat shorter than the internal dimensions of such a box formed of section 31. It is thus only necessary to provide special top and bottom boards to complete the enclosure of the box. It will accordingly be seen that very little extra weight or material is entailed in connection with shipment of these units.

The invention herein described may be manufactured and used by or for the Government of the United States of America for governmental purposes without the payment of any royalties thereon or therefor.

I claim:

1. In combination with an item of ordnance adapted to travel successively through air and water, means for controlling the attitude of such item in flight and resultantly the manner of its entry into the water, comprising a substantially cylindrical blunt-nosed assembly, adapted to encircle the forward end of said item of ordnance and constructed of material frangible by impact with the water to permit separation of the assembly from said item of ordnance.

2. Means as set forth in claim 1 in which said assembly comprises a plurality of partly cylindrical sheet sections, and means for adjustably securing together the margins of said sheet sections.

3. In combination with an item of ordnance having a head section with a diminishing nose portion and adapted to travel successively through air and water, means for controlling the attitude of said item in flight and resultantly the manner of its entry into the water, comprising a blunt-nosed assembly separably secured to said item of ordnance and at least partly formed of material frangible by impact with the water to permit separation of the assembly from said item of ordnance, said assembly comprising sheet-like plywood bent to substantially cylindrical form, and means for securing said assembly to said item of ordnance in such position that the assembly provides a continuous cylindrical forward extension of greater diameter than that of the head section and its diminishing nose portion.

4. Means as set forth in claim 3 in which said assembly comprises reinforcing means forming part of the projecting portion, and means attached to said reinforcing means for centering the assembly on the diminishing nose portion.

5. Means for controlling the aerial flight of a torpedo having a diminishing nose portion at its forward end and adapted to travel successively through air and water, comprising; a blunt nosed assembly adapted to be separably secured to said nose portion at least partly formed of material frangible by impact with the water to permit separation of the assembly from the torpedo, and means for securing said assembly to the torpeto in such position that the assembly provides a continuous forward extension of greater diameter than that of the diminishing nose portion.

6. Apparatus adapted to assist in controlling the air flight of an elongated torpedo of the type having a nose portion of diminishing cross section in a direction toward its forward end and a plurality of angularly spaced radially extending fins at its tail portion, comprising; a drag structure secured to said nose portion adapted to spoil the normal flow of air around said diminishing cross section and present an effective substantially planar cross section at the forward end of the torpedo and symmetrically about its longitudinal axis adapted to produce increased air drag thereof, and a fin structure secured to the tail of the torpedo surrounding said fins, at least a part of each of said structures being frangible by impact with the water to thereby totally break away from the torpedo.

7. A device applicable to a missile having a vulnerable mechanical part at its rear end and being adapted to be dropped from an altitude into a body of water, said device comprising an assembly of sections made of relatively rigid but light-weight and frangible material, and means for fastening the sections together into encasement around said part, said encasement being shatterable upon impact with the surface of the water.

References Cited in the file of this patent

UNITED STATES PATENTS

| | | |
|---|---|---|
| 1,290,829 | Carpentier | Jan. 7, 1919 |
| 1,508,317 | Crocco et al. | Sept. 9, 1924 |
| 2,035,185 | Nichols | Mar. 24, 1936 |

FOREIGN PATENTS

| | | |
|---|---|---|
| 338,064 | Great Britain | Nov. 13, 1930 |